June 29, 1971  A. LIPSKI  3,588,971
APPARATUS FOR MANUFACTURING A PAIR OF PREBENT GIRDERS
Filed Aug. 11, 1969  5 Sheets-Sheet 1
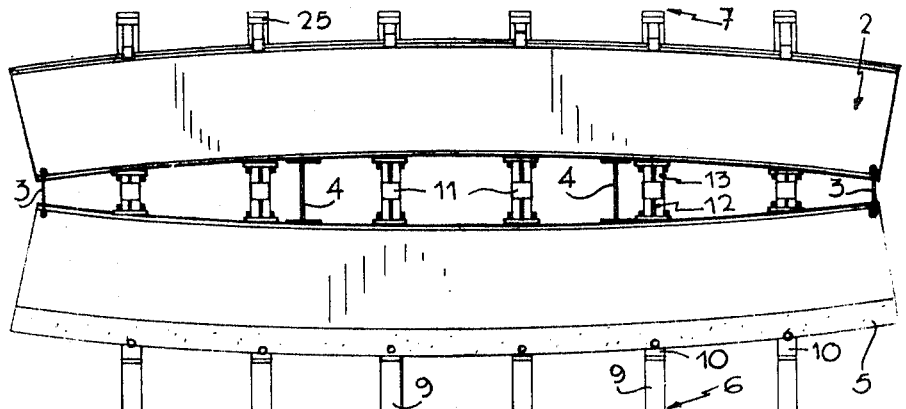
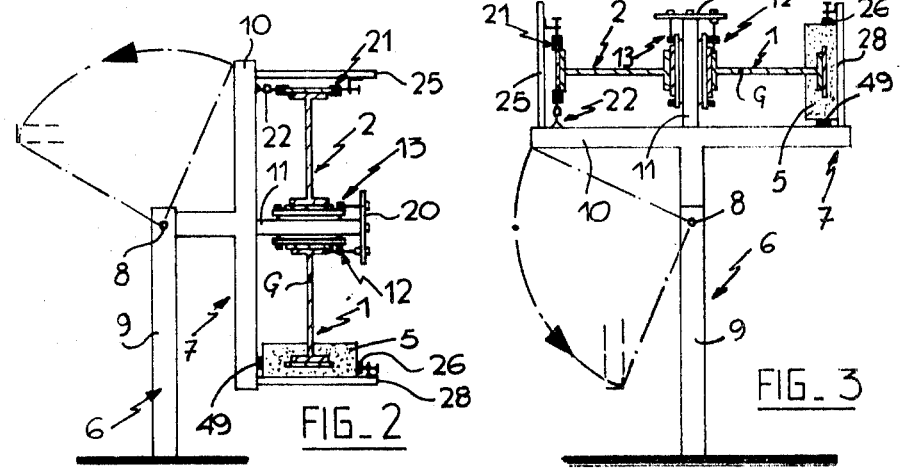
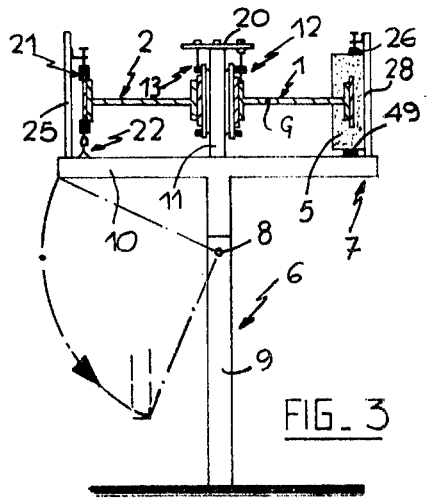
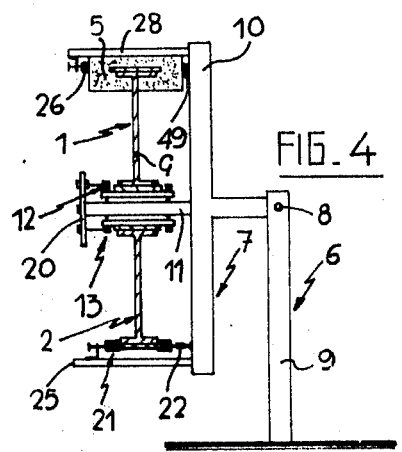
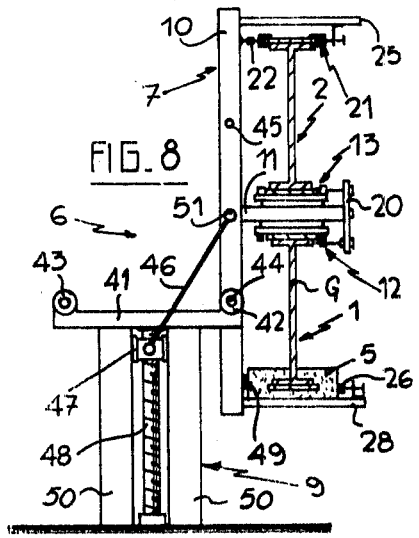
INVENTOR
ABRAHAM LIPSKI
BY Young & Thompson
ATTYS.

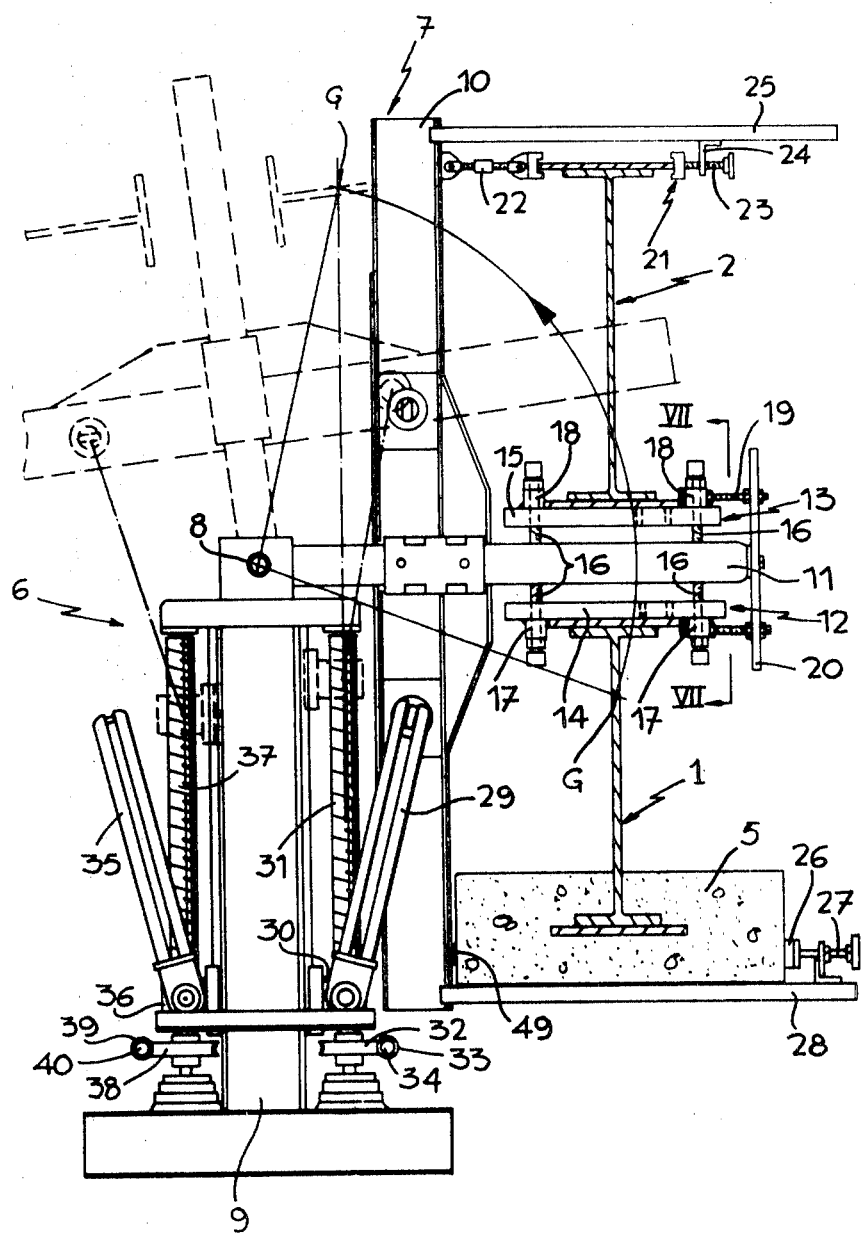

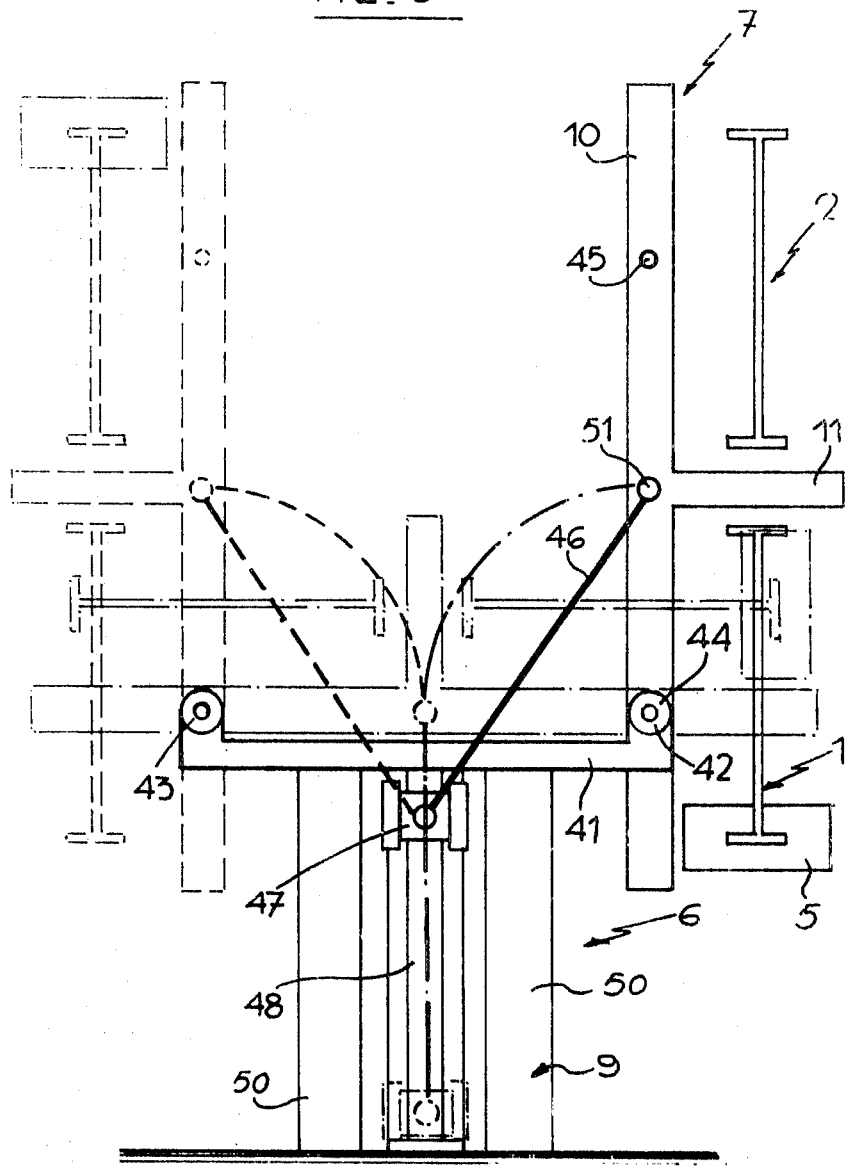

United States Patent Office 3,588,971
Patented June 29, 1971

3,588,971
APPARATUS FOR MANUFACTURING A PAIR OF PREBENT GIRDERS
Abraham Lipski, Uccle, Belgium, assignor to Procedes Nouveaux de Construction, "Preflex" Societe Anonyme, Saint-Gilles, Belgium
Filed Aug. 11, 1969, Ser. No. 848,790
Claims priority, application Belgium, Aug. 19, 1968, 62,395
Int. Cl. B28b 7/08
U.S. Cl. 25—118T       9 Claims

ABSTRACT OF THE DISCLOSURE

Apparatus for manufacturing a pair of prebent girders by prebending simultaneously the metal trusses of said girders in a vertical plane, maintaining them in the prebent position and embedding the tension flange of the lower truss in a mass of concrete and, the concrete having set, pivoting the pair of trusses around one or several axes, which are horizontal and parallel to said vertical plane, until their respective positions are reversed and then embedding the tension flange of the other truss. A tilting-device is also provided for such a pair of prebent trusses, the lower one of which having its tension flange embedded in a mass of concrete. The device comprises at least two tilting-mechanisms, constituted respectively of truss-supports pivoting around one or several successive axes, which are horizontal and parallel to said vertical plane.

---

Figure 6:
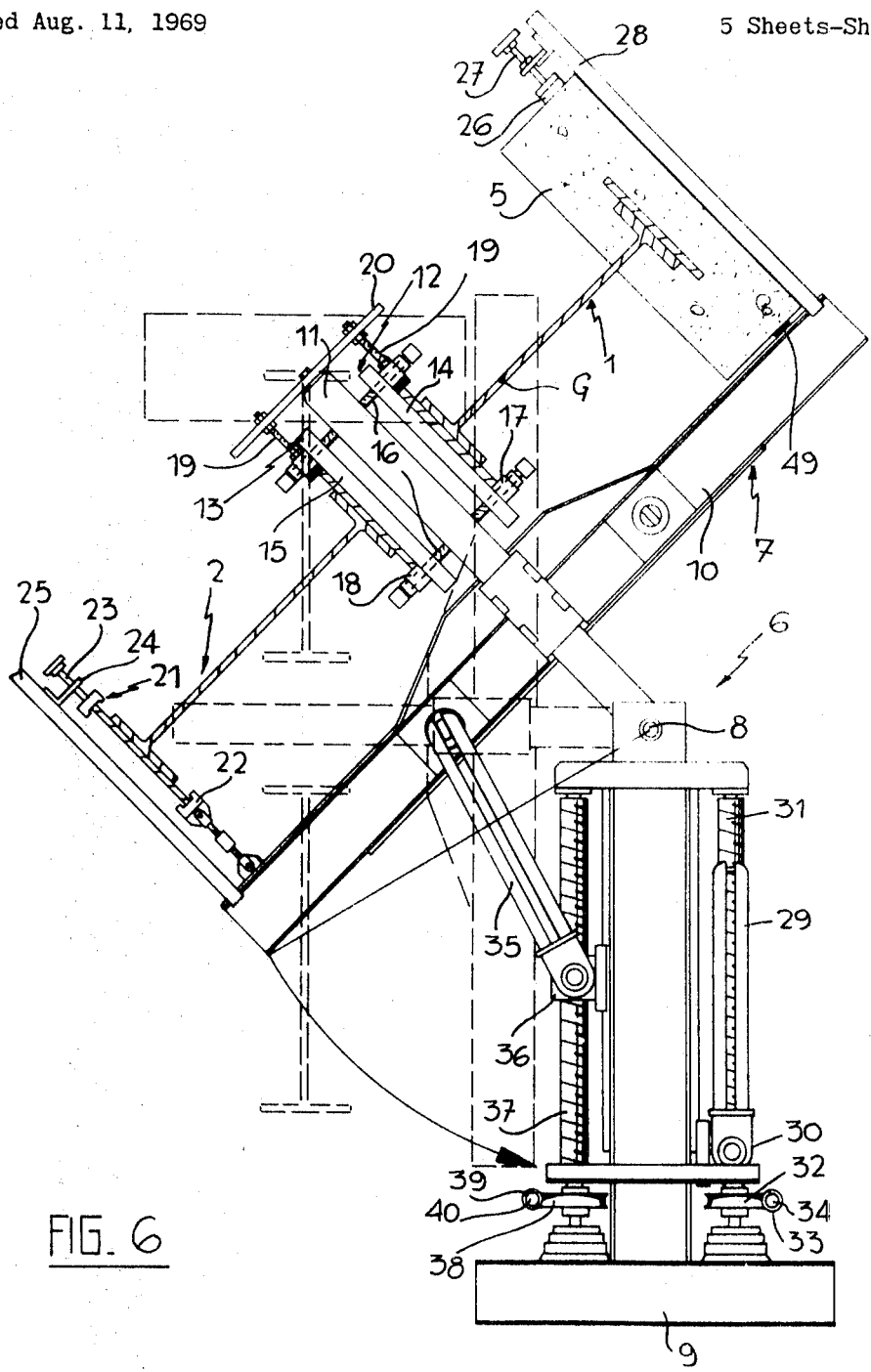

This invention relates to apparatus for manufacturing a pair of prebent girders. With this apparatus, the rigid metal trusses of said girders are simultaneously prebent in a vertical plane, the trusses are maintained in this prebent position and the tension flanges of the trusses are embedded in masses of concrete.

In the prior art, a casing has to be arranged around each tension flange of the two trusses, before pouring of the concrete. The placing of the casing sets no problem, as far as the lower truss is concerned. The tension flange of this truss occupies a lower position, which is no hindrance to the placing of the lower casing.

The realization of the upper casing, necessary for the embedding of the tension flange of the upper truss is fairly more difficult. This flange, indeed, has an upper position and the web of this truss is a hindrance to the placing of the upper casing. This casing has to be carried out in two parts, arranged on both sides of said web and tightened against it. This results in a serious problem of tightness, as the casing-boards have to be applied against the web in a perfectly tight manner. The placing of such a casing thus takes a fairly long time.

The present invention overcomes these disadvantages by avoiding the necessity to carry out the upper casing as usual.

According to the invention, this is realized by first embedding in a mass of concrete the tension flange of the lower truss. After setting of the concrete, the pair of trusses with the mass of concrete is rotated around one axis, respectively several successive axes, which are horizontal and parallel to the above mentioned vertical plane, until their respective positions are reversed. Then the tension flange of the truss, that has become the lower one by rotation, is embedded in a mass of concrete.

During the rotation of the pair of trusses, these are advantageously supported continually in at least two vertical transverse-planes, perpendicular to the instantaneous-axis of said rotation. The trusses are furthermore simultaneously driven around this axis at identical instantaneous angular speeds.

It is evident that before the pivoting of the combined trusses, not only the concrete must have set, but it must have reached sufficient cohesiveness to avoid any damage during the pivoting.

The apparatus for manufacturing a pair of prebent girders comprises a device for tilting the pair of metal trusses of said girders, said trusses being prebent in a vertical plane. The tilting device comprises at least two tilting-mechanisms, constituted of the respective truss-supports, pivoting around one axis, respectively several successive common axes, which are horizontal and parallel to the above mentioned vertical plane.

In one especially advantageous embodiment of the device according to the invention, each truss-support is formed of a rib, parallel to the plane of the truss-webs and a transversal rib, perpendicular to the same plane. These two ribs are rigidly assembled together. The latter is placed between the trusses and is principally acted upon by the trusses in and near the extreme pivoting-positions, whereas the first one is placed laterally to these trusses and is principally charged by the latter in the intermediate positions of the pivoting movement, especially in the half-way position.

Each truss-support is able to rotate during the complete rotation around a sole horizontal axis or successively around two distinct horizontal axes. In the first case, each truss-support pivotes, on the one hand and during the first part of its rotation, around the horizontal axis, by the action of a jack through a connecting-rod and, on the other hand, during the second part of its rotation, by the action of another jack, through another rod. In the second case, each support mentioned above pivots under the action of a single jack, through a single rod, whose movement goes in one direction during the pivoting around one of the horizontal axes and in another direction during the rotation around the other horizontal axis.

Other details and particular features of the invention will appear in the following description of the embodiments of the device according to the invention. These embodiments are given by way of examples, with reference to the accompanying drawings. It is evident that the present invention is not limited to the given examples.

Figure 7:
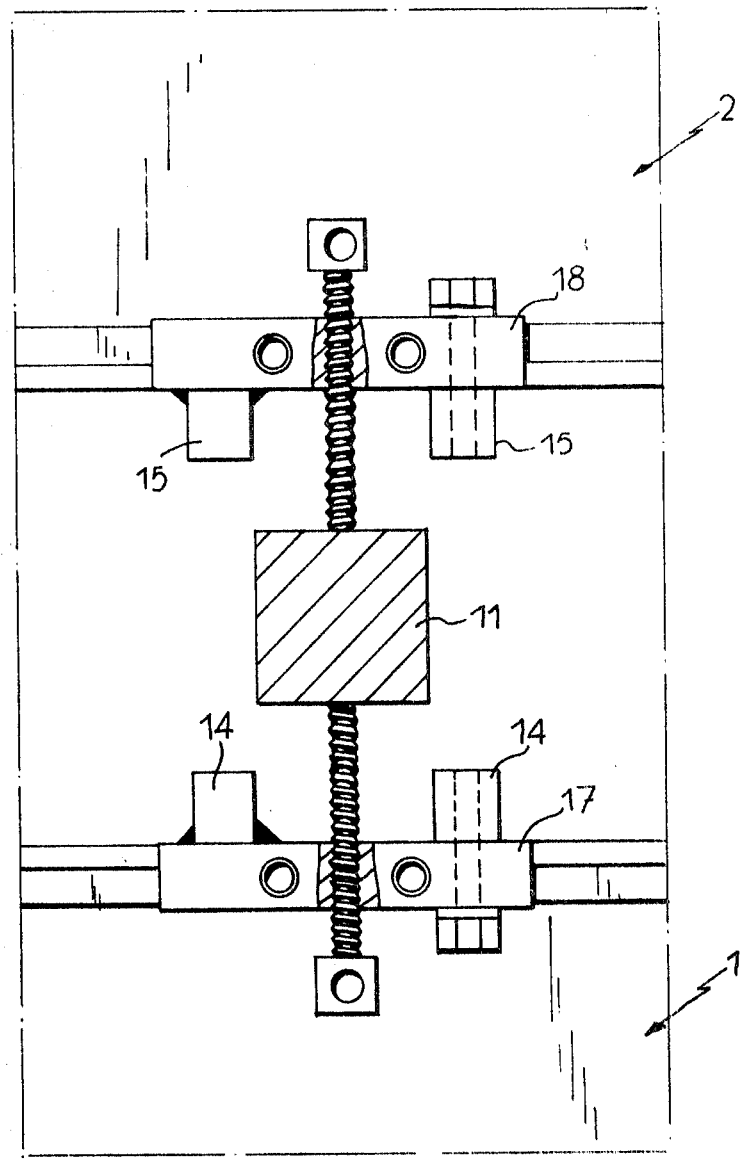

In these drawings:
FIG. 1 is an elevation of a first embodiment of the device according to the invention;
FIGS. 2, 3 and 4 are diagrammatic cross-sections along the line II—II of FIG. 1, showing the pair of trusses before, during and after the pivoting, respectively;
FIG. 5 and 6 are side-views of a tilting mechanism of the device, showing the pair of trusses in different positions;
FIG. 7 is a cross-section along the line VII—VII of FIG. 5;
FIG. 8 is a diagrammatic cross-section similar to that of FIG. 2 and relates to a second embodiment of the device according to the invention;
FIG. 9 is a diagrammatic illustration of the pivoting of a truss-support.

In these figures, the same reference numerals refer to similar elements.

FIG. 1 shows two trusses 1 and 2, prebent in opposite directions in a same vertical plane. The simultaneous prebending of these two trusses is maintained by truss-rods 3 and cross-bars 4, which are in the form of I-beams. The tension flanges of the prebent trusses 1 and 2 are to be embedded in masses of concrete, so as to fasten their prebent condition. The mass of concrete 5, related to the truss 1, is therefore carried out first, then these trusses are rotated to invert their positions and the embedding of the tension flange of the truss 2 is then carried out. These trusses 1 and 2 are supported by the tilting-mechanism 6, constituting the illustrated device. Each tilting-mechanism 6 comprises a support 7 for the trusses 1 and 2. Said support 7 is mounted on a horizontal pivot 8, integral with the frame 9 of the tilting-mechanism 6 in such a way as to be able to pivot between a position (illustrated by FIG. 2), in which the truss 1 is vertical and under the truss 2, and the opposite position (illustrated by FIG. 4), in which the truss 2 is vertical and under the truss 1. Each support 7 comprises two ribs 10 and 11, rigidly assembled together and placed at right angles one to the other. The rib 10 is placed parallel to the plane of the webs of the trusses 1 and 2, whereas the rib 11 is perpendicular to the same plane and mounted on the pivot-axle of the support 7.

The trusses 1 and 2 are placed on each side of the rib 11 and mounted on the latter by means of frames 12 and 13. The compressed flanges of the trusses 1 and 2 are placed against the cross-pieces 14 and 15 of the frames 12 and 13 respectively, which rest on the rib 11 by means of press-screws 16, passing through stringers 17 and 18 of these frames. On the other hand, the position of the frames 12 and 13 relative to the rib 10 is adjustable by means of adjusting screws 19, connecting the side-members 18 with a section piece 20, affixed to the end of the rib 11. It is to be noted that the distance between the cross-pieces 14 and 15 of the frames 12 and 13 may advantageously be adjusted (see FIG. 7) so as to be slightly superior to the thickness of the rib 11. Thus it is possible, in the proximity of the ends of the trusses 1 and 2, to bring the cross-pieces 14 of the frame 12 sufficiently near the cross-pieces 15 of the frame 13 as to reduce the over-all dimensions of the device.

The tension flange of the truss 2 is inserted in a collar 21, which is in connection with the rib 10, on the one hand, by an adjusting screw 22 and, on the other hand, by a threaded press-rod 23, screwed to an angle-corner 24, integral with a beam 25, affixed to the rib 10.

The mass of concrete 5, in its turn, is inserted between a thrust 49 of the rib 10 and a locking-element 26, worked by a press-screw 27, mounted on a beam 28, affixed to said rim.

Each tilting-mechanism 6 comprises a first connecting-rod 29, connected with one of its ends to a nut 30, sliding on a vertical threaded shaft 31. This shaft is operated by a helicoidal wheel 32, gearing in a screw 33, fixed on a simultaneous driving-axle 34. The rod 29 is removably connected at its other end to the rib 10 of the support 7, so that the latter can pivot around the fixed pivot 8, by the rotation of the shaft 31, from the position represented in FIGS. 2 and 5 in full lines, into the intermediate position represented in FIG. 5 in dotted lines. In this intermediate position, the centre of gravity G of the whole formed by the support 7, the two trusses 1 and 2 and the mass of embedding concrete 5 is advantageously situated at G', near zenith and more precisely, fairly straight above the axle of the shaft 31. The frame 9, on the other side, forms constantly a guide and a side-support for the nut 30 to avoid a bending of the shaft 31.

Each tilting-mechanism 6 comprises furthermore a second connecting-rod 35, linked at one of its ends to a nut 36, screwed on another vertical threaded shaft 37. The latter is operated by a helicoidal wheel 38, working together with an endless screw 39, mounted on a driving-axle 40. The rod 35 is connected, at one end, to the rib 10 of the support 7, when this one holds the described intermediate position. After the disconnection of the rod 29 and the rib 10, the latter is brought to the position illustrated in the FIG. 4, where the truss 2 is perpendicular to and under the truss 1. The frame 9 too constitutes a guide and a support for the nut 36, to avoid a bending of the shaft 37.

The device according to the first embodiment presents two principal symmetry planes, the one for the stationary part (frame 9) and the other for the working part (support 7), so as to be able to pivot the trusses 1 and 2 indifferently in one direction or the other.

According to another especially advantageous embodiment of the device of the invention, shown in FIGS. 8 and 9, each tilting-mechanism 6 comprises a horizontal cross-piece 41, which forms a part of its frame 9. The ends of the cross-piece 41 are provided with two bearings 42 and 43, designed to hold respectively the two pivots 44 and 45 of the rib 10 of the support 7. This rib is connected, half-way between the pivots 44 and 45. to one of the ends of a rod 46, the other end of which is linked to a nut 47. The latter is movable on a vertical threaded shaft 48, operated in a similar manner to the one of the above mentioned shafts 31 and 37.

By rotating the threaded shaft 48, the support 7 pivots first on the pivot 44 in the bearing 42, to bring the whole of the trusses 1 and 2, to an intermediate horizontal position, then on the pivot 45 in the bearing 43, from this intermediate position in an opposite position to the initial one. It has to be noted that the lateral thrust of the nut 47 is constantly equilibrated by the struts 50 of the frame 9.

In a variation of the realization of the device, the pivot 51, articulating the support 7 with the rod 46, may advantageously be duplicated, in order to assure, at many moment, a position of the vertical, going through the pivot 51, exterior to the space embraced by the verticals going respectively through the centre of gravity G of the whole formed by the support 7, the trusses 1 and 2 and the mass of concrete 5, and the instantaneous rotation-pivot. During the first part of the rotation around the pivot 42, the vertical going through the pivot 51 is therefore at the left of the space included between G and this pivot 42. When the support 7 is in the intermediate horizontal position, the articulation-pivot 51 is moved in direction of the mass of concrete 5, in order to bring it to the right of the vertical going through G. Thus, during the second part of the rotation around the pivot 43, the vertical going through the articulation-pivot 51 is always at the right of the space delimited by the verticals going through G and the pivot 43, respectively.

It is evident, that the present invention is not limited to the two shown embodiments and that many modifications may be made in the form, the arrangement and the structure of some of the elements, which take place in the realization thereof, in accordance with the invention, provided that these modifications are not in contradiction with the content of any of the following claims.

What is claimed is:

1. A device for manufacturing a pair of prebent girders comprising:

means for supporting the metal trusses of said girders in a vertical plane;

means for prebending simultaneously said metal trusses in said vertical plane and for maintaining them in the prebent position;

means for embedding the tension flange of the lower truss in a mass of concrete;

means for tilting said pair of metal trusses and said mass of concrete after setting thereof comprising at least two tilting mechanisms, constituted by the support for said trusses pivoting around a plurality of axes which are horizontal and parallel to said above-mentioned vertical plane; and means for embodding the tension flange of the other truss in another mass of concrete.

2. A device in accordance with claim 1, wherein each truss-support is formed of a rib, parallel to the plane of the truss-webs and a transversal rib, perpendicular to that same plane, these two ribs being rigidly assembled together, the latter being placed between the trusses and acted upon by the trusses principally in and near the extreme pivoting-positions, whereas the first one is placed laterally to these trusses and is principally charged by the latter in the intermediate positions of the pivoting movement, especially in the half-way position.

3. A device in accordance with claim 1, wherein each truss-support pivots around a single horizontal axle during the complete rotation.

4. A device in accordance with claim 3, wherein each truss-support pivots around the horizontal axle during the first part of its rotation, by the action of a jack, through a connecting-rod and, during the second part of the rotation, by the action of another jack, through another rod.

5. A device in accordance with claim 4, wherein said first jack serves to displace the centre of gravity of the rotating load to the proximity of its zenith, whereas the second jack serves to bring down the load at the opposite side.

6. A device in accordance with claim 1, wherein each truss-support pivots successively around two distinct horizontal axles during the two successive parts of the rotation, respectively.

7. A device in accordance with the claim 6, wherein each truss-support pivots under the action of a single jack, through a single connecting-rod, whose movement goes in one direction during the pivoting around one of the horizontal axles and in another direction during the rotation around the other horizontal axle.

8. A device in accordance with the claim 7, wherein the articulation-axis of the rod and the truss-support is moved in direction of the mass of concrete, during the change of the pivoting-axle, in order to assure a position of the vertical, going through said articulation-axle, constantly exterior to the space delimited by the verticals, going respectively through the instantaneous pivoting-axis and the centre of gravity of the whole formed by said support, trusses and mass of concrete.

9. A device in accordance with claim 3, wherein said device presents two principal symmetry planes, one for the stationary part, the other for the working part, so as to be able to realize directly, at the end of a pivoting, a same pivoting in the opposite direction.

References Cited
UNITED STATES PATENTS

| | | | |
|---|---|---|---|
| 1,567,245 | 12/1925 | Collier et al. | 249—50X |
| 1,640,983 | 8/1927 | Crom | 249—50X |
| 3,034,563 | 5/1962 | Gaspar et al. | 72—705 |
| 3,080,636 | 3/1963 | Zerlaut. | |
| 3,239,186 | 3/1966 | Esquillan | 249—50X |

FOREIGN PATENTS 561,945 11/1957 Belgium.

J. SPENCER OVERHOLSER, Primary Examiner

B. D. TOBOR, Assistant Examiner

U.S. Cl. X.R.

249—50, 83, 137, 139